United States Patent
Gesell

[11] Patent Number: 6,050,757
[45] Date of Patent: Apr. 18, 2000

[54] ROTARY MILLING PROCESS AND DEVICE

[75] Inventor: Reinhold Gesell, Weihenzell, Germany

[73] Assignee: Widia GmbH, Essen, Germany

[21] Appl. No.: 09/068,759

[22] PCT Filed: Nov. 15, 1996

[86] PCT No.: PCT/DE96/02195

§ 371 Date: May 13, 1998

§ 102(e) Date: May 13, 1998

[87] PCT Pub. No.: WO97/21513

PCT Pub. Date: Jun. 19, 1997

[30] Foreign Application Priority Data

Dec. 11, 1995 [DE] Germany .......................... 195 46 197

[51] Int. Cl.$^7$ .................................................. B23C 3/06
[52] U.S. Cl. ........................... 409/132; 82/106; 409/200; 409/203
[58] Field of Search .................... 409/199, 200, 409/131, 132, 203, 197; 82/106

[56] References Cited

U.S. PATENT DOCUMENTS

| | | | |
|---|---|---|---|
| 4,116,111 | 9/1978 | Schmid | 82/106 |
| 4,208,156 | 6/1980 | Kralowetz et al. | 82/106 |
| 4,269,551 | 5/1981 | Kralowetz | 82/106 |
| 4,326,323 | 4/1982 | Kralowetz et al. | 409/200 |
| 4,790,698 | 12/1988 | Heffron | 409/199 |
| 5,349,888 | 9/1994 | Schmid | 82/106 |
| 5,725,339 | 3/1998 | Yoshita | 409/132 |
| 5,829,930 | 11/1998 | Shimomura | 409/199 |

FOREIGN PATENT DOCUMENTS

| | | |
|---|---|---|
| 1 600 140 | 8/1970 | France . |
| 17 52 049 B2 | 5/1971 | Germany . |

*Primary Examiner*—Steven C. Bishop
*Attorney, Agent, or Firm*—Herbert Dubno

[57] ABSTRACT

The invention relates to a process and a device for machining of workpieces (10) like crankshafts or similar components which are rotated about their own axis during machining, at least two mutually independently operating rotary milling tools (15, 16, 21, 22) performing material-removing operations simultaneously at different points on the workpiece. In order to maximize the edge life of the tools used, with special regard to the most uniform wear possible on all the rotary milling tools, it is proposed that the rotation speed of the tools be matched or varied to provide an optimum cutting operation and the rotation speed of the second and any other rotary milling tool be controlled dependently upon the tool rotation speed predetermined by the matching or variation.

16 Claims, 4 Drawing Sheets

ROTARY MILLING PROCESS AND DEVICE

CROSS REFERENCE TO RELATED APPLICATIONS

This application is the US national phase of PCT application PCT/DE96/02195 filed Nov. 15, 1996 with a claim to the priority of German application 195 46 197.5 filed Dec. 11, 1995.

FIELD OF THE INVENTION

The invention relates to a method of rotary milling workpieces such as crankshafts or the like which are rotated during the machining operation about their own axes while simultaneously at least two independently operating rotary milling tools carry out machining operations on different locations on the workpiece.

The invention further relates to a rotary milling apparatus.

BACKGROUND OF THE INVENTION

A rotary milling tool is formed as a disk or cylindrical body whose rotation axis is parallel to the rotation axis of the workpiece. Cutting tools carried on the periphery or outer surface of the disk or cylinder perform successive necessary cutting operations on the workpiece, the rotary milling tool also being outfitted with different cutting inserts for different machining purposes, such as coarse and fine machining.

The main application of the method according to the invention is predominantly in the automobile and utility vehicle industry, there in particular in the machining of the main and pin bearings of crankshafts, cam shafts, flywheel gears, and axles.

In order to machine a cast crankshaft blank the actual crankshaft is mounted at both ends in chucks of a machine equipped with respective main spindles. The main spindles are driven by two synchronously running multiphase motors. In order to be able to machine both the main bearings as well as the pin bearings, which are axially offset from one another, the chucks of the machine are vertically adjustable in their holders. According to the number of main or pin bearings to machine, according to the prior art rotary milling tools are moved by means of supports radially toward the respective bearings until the cutting inserts mounted on the periphery or outer surface of the rotary milling tool enter into contact with the parts of the workpiece to be machined. In order to be able to machine the pin bearings which are eccentric to the crankshaft axis over their entire cylindrical outer surfaces, it is necessary to move the rotation axis of the rotary milling tool in a circular arc. The simultaneous machining of two or more pin bearings by a corresponding number of rotary-milling tools is no problem with respect to setting of the tool advance and the respective rotary rotation rate of the workpiece and of the rotary-milling tools since similar cutting operations can be carried out parallel next to one another. The same is true for the simultaneous machining of main bearings or the simultaneous machining of cheeks, counterweights, or other similar parts of the workpiece. The cutting inserts on the respective rotary-milling tools are very greatly stressed with such operations so that as a rule one can count on a generally similar long service life of all the rotary milling tools that are used for the same cutting operations.

Different relationships exist however when simultaneously different workpiece parts, for example crankshaft parts such as for example cheeks on the one hand and main bearings on the other are being machined. A constant workpiece rotation speed has the disadvantage that it is only optimized for one cutting operation, for example machining of the main bearings. In addition the actual arc length for workpiece parts such as cheeks vary considerably due to their lack of rotation symmetry.

OBJECTS OF THE INVENTION

SUMMARY OF THE INVENTION

It is therefore an object of the present invention to provide a rotary-milling method by means of which the service life of the employed tools can be maximized, with in particular the most uniform possible wear of all rotary-milling tools.

This object is achieved according to the invention in that the workpiece rotation speed is varied or set to obtain an optimal machining with one rotary-milling tool and the tool rotation speed of the second and each further rotary-milling tool is set in accordance with the varying or set workpiece rotation speed. The method is applicable for inside as well as outside machining operations.

The method according to the invention is based on the realization that the optimal machining operation of a tool with respect to cutting and wear characteristics is determined by the workpiece rotation speed. Since this workpiece rotation speed would impair the service life of the second tool with respect to length and cutting capacity, the tool rotation speed of the second tool is reset (relative to the first tool) so that with a given workpiece rotation speed optimal machining can also be obtained here. Simply put the first rotary milling tool determines the master parameters that the second workpiece follows slavishly by appropriate regulation (master/slave principle).

Preferably according to the method of the invention the optimal workpiece rotation speed for each of a plurality of machining operations carried out at succeeding times is determined for each of the rotary-milling tools and then the lowest of the determined workpiece rotation speeds is employed, the tool rotation speeds of the others for which respective higher tool rotation speeds have been determined being correspondingly set. This step is based on the recognition that not only one rotary milling tool can be the one determining the workpiece rotation speed, but that during successive machining operations the dominant or master tool changes according to the type of machining operation so that the lowest possible workpiece rotation speed might change. In the case of two simultaneous machining operations it can initially be the case that the first machining is dominant with respect to workpiece rotation speed but during the second machining operation the workpiece rotation speed set according to the first machining operation has to be adjusted so that after machining for a certain amount of time the workpiece rotation speed of the second different machining operation becomes controlling so that the workpiece rotation speed must be reduced. As a result of this aspect of the invention it is also possible to select the higher workpiece rotation speed from below a predetermined optimal workpiece rotation speed, the higher workpiece rotation speed then also being above a fixed lower limit or not allowed to go below it.

According to a further feature of the method according to the invention preferably with all simultaneously conducted machining operations a constant chip thickness of 0.1 to 0.3 mm, preferably 0.2 to 0.25 mm, is established by the advance of the rotary miller. This is based on the recognition according to the invention that thinner chip thickness leads to longer tool service life.

Preferably, with two rotary tools which simultaneously conduct milling operations, the predetermined chip thickness and the constant tool rotation speed of a first rotary milling tool are proportionately combined, in particular when machining a cheek of a crankshaft, to determine the speed profile of the workpiece necessary to maximize the service life of the rotary milling tool and the tool rotation speed of the second rotary-milling tool is set in accordance with this speed profile. This further development of the method presumes that the workpiece rotation speed is changed during the machining operation without however dropping reliance on the parameters of the first selected rotary milling tool until, to optimize tool service life, the second machining operation requires a lower workpiece rotation speed that then switches reliance to the parameters of the second machining operation.

Preferably the workpiece rotation speeds are changed linearly between two limits, which with wide machining-location variations of a workpiece gives corresponding short adaptation times for the workpiece rotations speed as relatively long conformation of workpiece rotation speed with smaller deviations. In particular the amounts of time for which an optimal workpiece rotation speed is determined are established depending on the changes of the workpiece contours or arc lengths to be machined, in particular the cheek shape and the thus produced arc length are determined.

Preferably the method according to the invention is employed for the simultaneous machining of pin bearings, main bearings, and/or cheeks of a crankshaft.

According to another feature of the invention each tool is moved along at least one axis depending on the angular position of the workpiece so that as a result of or after machining there is a cylindrical shape (for pin bearings). The contact-arc length, that is the portion of the workpiece in contact with the respective cutting insert relative to its overall circumference is only ¹⁄₁₀ to ¹⁄₁₀₀₀ of the overall circumference.

According to another feature of the invention the cutting inserts are distributed on two rotary-milling tools such that a first tool machines the right side and half of one crank pin and the other tool the left side and half of the crank pin. Preferably an orthogonal rotary miller is used as milling tool.

To optimize the machining conditions the cutting inserts are set in the respective rotary-milling tool or guided so relative to the workpiece to create an effective cutting angle between −5° and +15°, preferably −5° to +5°, relative to the workpiece The back cutting angle should be between 0° and 10°. The sum of the free angle and of the wedge angle of the cutting inserts is 75° to 95°, preferably 85° to 95°.

When machining parts lying eccentric to the workpiece rotation axis, as for example pin bearings, the feed of the workpiece along only one axis with uniform rotary movement and with the same offset produces an irregular chip thickness. According to a further development of the invention this forseeable irregularity can be compensated for to produce uniform chip thickness.

The apparatus for carrying out the method according to the invention has at least two rotary high-speed milling tools fitted with cutting inserts with for each rotary milling tool a respective support with a respective rotary drive and the rotary drives are connected to a speed regulator. Preferably one support has two slides which make possible movement of the workpiece in two mutually perpendicular directions. This also makes it possible to produce undercuts.

The described method as well as the described apparatus have the advantage that the overall workpiece machining time, the cycling time, is substantially reduced since adjacent but different parts, that is for example main bearings on the one hand and cheeks on the other, can be machined. The method according to the invention increases the surface finish and the accuracy of the finish machined workpieces while also avoiding high machining forces and high cutting temperatures.

BRIEF DESCRIPTION OF THE DRAWING

Embodiments of the invention are shown in the drawing. There is shown in.

SPECIFIC DESCRIPTION

Figure 1:
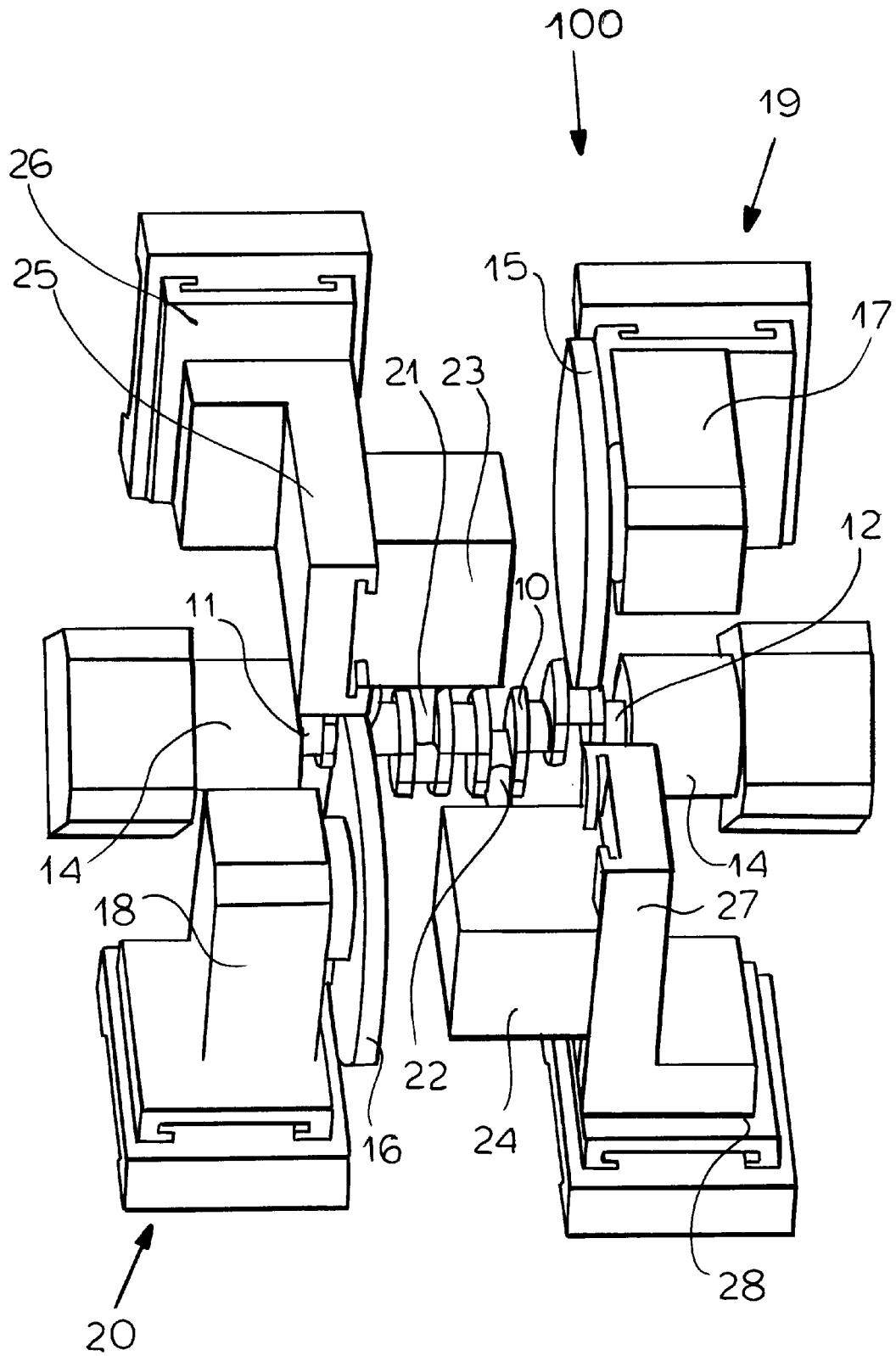
FIG. 1 is a schematic diagram of the apparatus according to the invention with a mounted crankshaft.

FIG. 1 shows in purely schematic form an apparatus 100 for metal-cutting machining relative to the most important parts of the current invention which are all mounted in a machine frame not shown in the drawing. The workpiece 10, here a crankshaft, is held with its ends 11 and 12 in drivable rotatable chucks 13 and 14 so that it is rotatable about its central axis. Disk-shaped high-speed tools 15 and 16 powered by corresponding drives 17 and 18 serve for machining, each drive 17 and 18 being mounted in a support 19 and 20 and each tool being moved along an axis relative to the workpiece. Furthermore the apparatus 100 carries two orthogonal rotary millers 21 and 22 which are also rotated by respective drives 23 and 24. Each orthogonal miller 21 and 22 is carried on a support with two slides 25, 26; 27, 28 so that advance of each orthogonal miller 21 and 22 can also take place when the crankshaft rotates. The illustrated apparatus can simultaneously machine four cranks.

Figure 2:
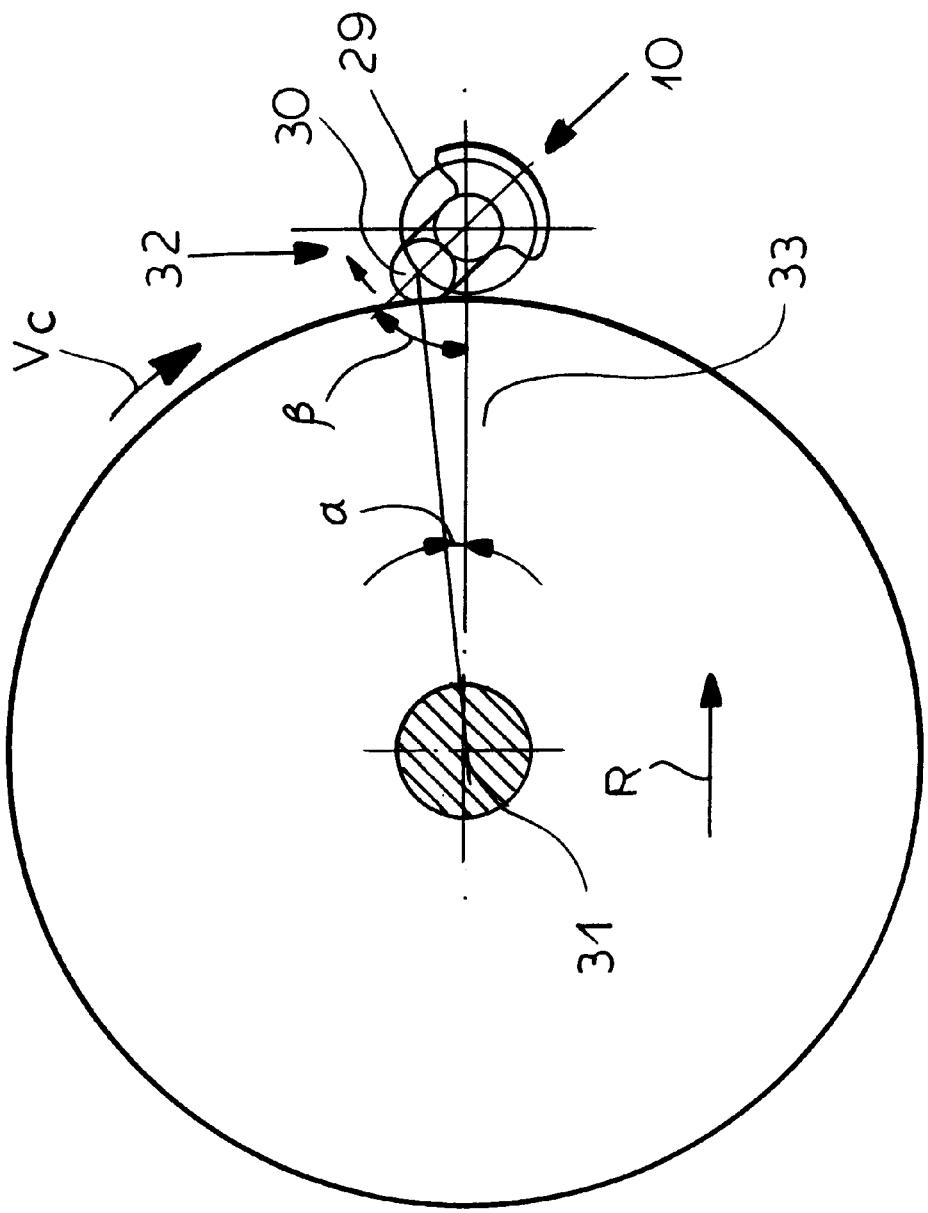
FIG. 2 is a schematic representation of the operation according to the method.

The functioning of the high-speed tool as takes place in the apparatus 100 is shown purely schematically in FIG. 2. In order in fact to carry out a metal-cutting machining of a crank pin 30 outside the center of rotation 29 of the workpiece 10, the disk-shaped tool 15 is rotated about its center axis 31 with constant or variable high speed so that the indexable cutting plate not shown in FIG. 2 mounted on the insert on its periphery can be moved past the machining location 32 with a high working speed Vc. The machining location 32 moves with rotation of the tool 10 about the center of rotation 29 and out of a horizontal plane 33 by an angle β. To advance the tool 15 it is moved in direction R along the horizontal axis 33 so that the machining location 32 deflected by the angle α relative to the center axis 31 of the tool 14 is always reached. The tool 15 is thus advanced along the axis of tool-advance movement lying in the horizontal plane 33 dependent on the rotation angle β of the workpiece 10 such that after the metal-cutting machining at the machining location 33 a cylindrical shape is produced. The high cutting speed and the small chip thickness between 0.2 and 0.25 mm cause smaller forces to be exerted on the workpiece 10 and minimal wear on the cutting inserts as will be explained according to the instant invention.

Figure 4:
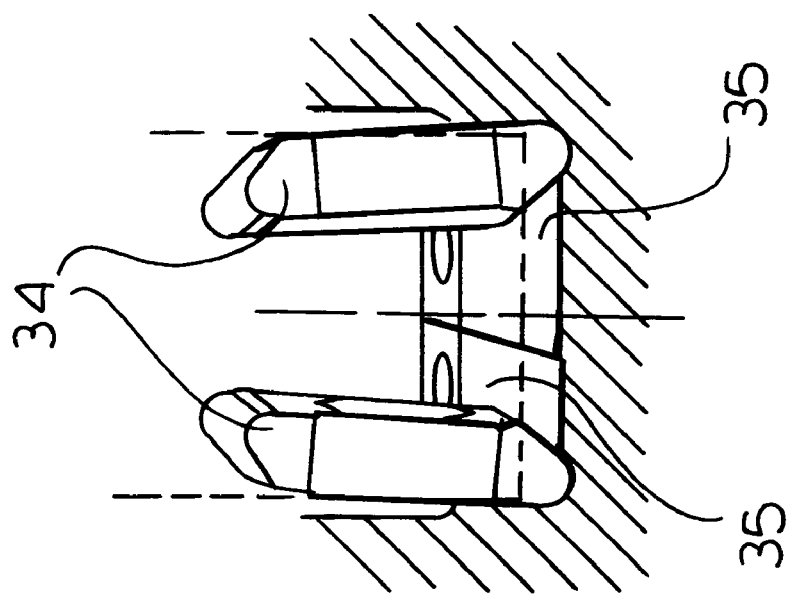
FIG. 4 is the operation of two cutting inserts or two cutting-insert pairs.
Figure 3:
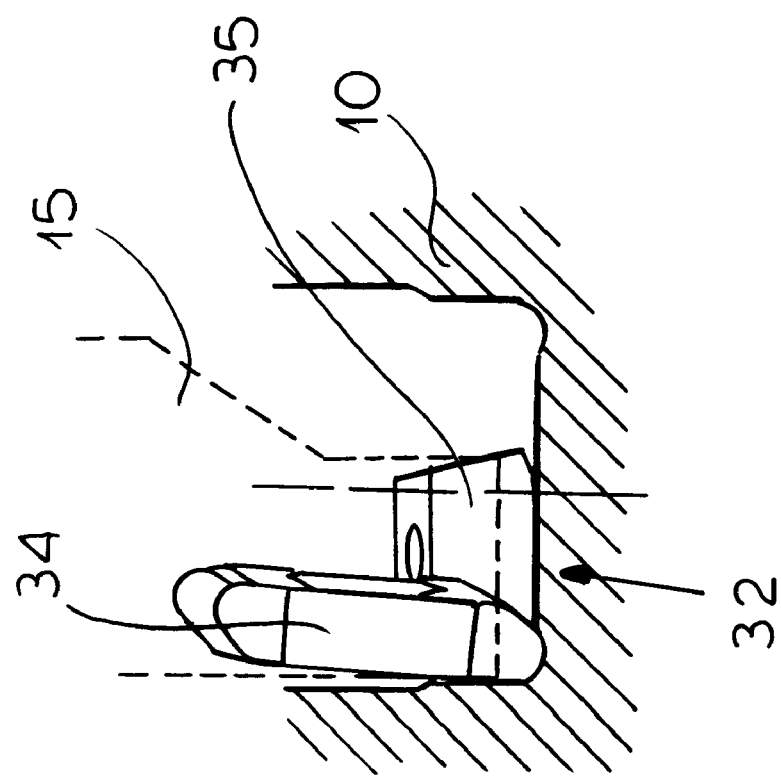
FIG. 3 is a schematic representation of the operation of two cutting inserts.

FIG. 3 shows in a purely schematic and partially sectional view how different insert bodies 34 and 35 can be mounted on a tool 15 so as to produce at a machining location 32 of a workpiece 10 a cylindrical shape, in particular for machining the pins of a crankshaft. In the illustrated embodiment the insert body 34 produces an undercut while the insert body 35 produces the outside diameter of the pin. The final shape, that is two undercuts and the pin machining, can be produced by a single tool in one machining operation whereby for the final shape if necessary a setting back, an axial displacement, and a new advance are carried out at the corresponding locations according to FIG. 4 whereby if necessary for an eventual adjustment for wear a pulling back, axial shifting, and renewed advance is done at the appropriate location.

When the pin length is machined with two tools, shape flaws in the overcut, which are possibly produced by out-of-round rotation of the workpiece or a kinematic problem, are held as small as possible. To this end the cutting insert 35 has a positive cutting angle and is oriented or moved relative to the workpiece at an effective cutting angle $\gamma_f$ between $-5°$ and $+15°$, preferably $-5°$ to $+5°$. The back cutting angle (axial cutting angle) $\gamma_p$ is positive and can be up to $10°$. The sum of the free angle $\alpha$ (relative to the workpiece) and the wedge angle $\beta$ of the cutting inserts lies between $75°$ and $95°$, preferably $85°$ to $95°$.

Figure 5:
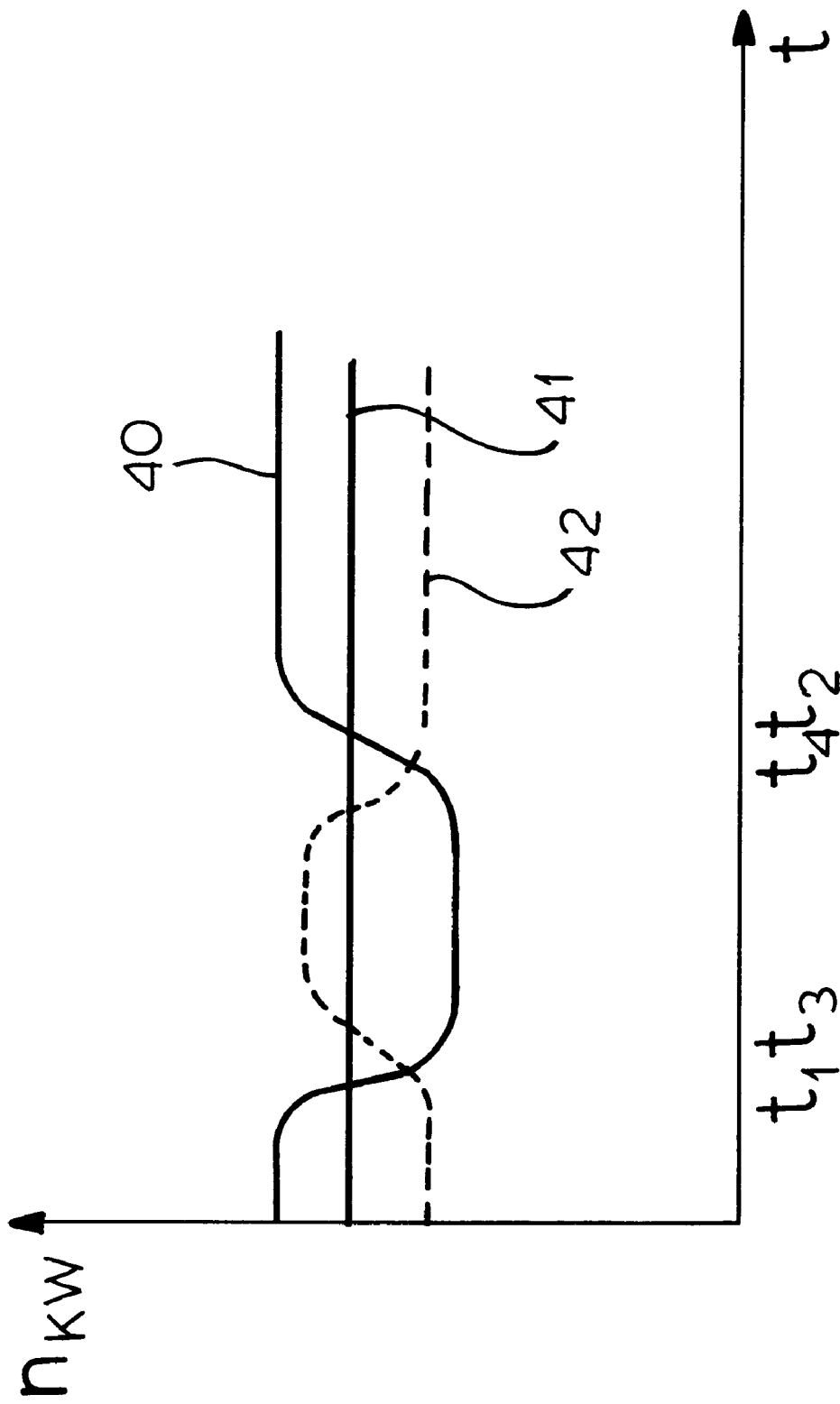
FIG. 5 is a rotation diagram.

The method according to the invention is described in the following with reference to the machining of a crankshaft where two independent rotary milling tools are simultaneously used next to one another with the first tool machining a crankshaft cheek and the second tool machining a pin bearing. The crankshaft cheek should have in this situation a variable offset. For initially optimizing the service life with the crankshaft machining tool a constant chip thickness $h_{max}$ and a constant rotation speed $v_c$ of this cheek machining tool are used. According to the offset the optimal speed profile 40 for the workpiece rotation speed corresponds to the offset or is determined according to time (see FIG. 5). To machine the crankshaft pin a constant rotation speed 41 is optimal. Also presumed here is a constant chip thickness $h_{max}$ of 0.2 to 0.25 mm. The offset is also constant with the pin or pin portion being machined. Since the workpiece rotation speed is determined by the cheek-machining tool, this rotation speed variably controls the rotation speed of the pin-machining tool.

According to an improved embodiment to the invention the rotation-speed curve 40 or 41 shows that up to time $t_1$ the rotation speed 41 is lower, so that up to time $t_1$ the workpiece, namely the crankshaft, is driven with this lower rotation speed 41. During this time the pin-machining tool is dominant, that is the rotation al speed of the cheek-machining tool is controlled up to time $t_1$ in accordance with the workpiece rotational speed. Between times $t_1$ and $t_2$ the variable cheek shape requires for optimal machining conditions a smaller rotary speed 40, so that during the period $t_2$-$t_1$ the cheek-machining tool is dominant and the rotation speed of the pin-machining tool is correspondingly regulated. Since the tool rotation speed is changed between the times $t_1$ and $t_2$, a corresponding change of the rotation speed of the pin-machining tool is necessary and this takes place in steps, that is in periods during which the rotation-speed change of the crankshaft varies most strongly, the accommodations are made in shorter intervals linearly while in times of smaller changes bigger intervals, also linearly, are used. Once the time $t_2$ is reached the pin-machining tool is again dominant and correspondingly the rotation rate of the cheek-machining tool is adjusted as shown by the there higher rotation rates of the curve 40 relative to the straight line 41.

The same is true for the machining of two workpieces of variable offset whose respective separately seen speed profiles are shown by the curves 40 and 42. Also here the actual workpiece rotation speed determines the rotation rate 42 up to the time $t_3$, between time $t_3$ and $t_4$ the rotation rate is selected according to the rotation curve 40, and after time $t_4$ it is again the rotation rate 42, the other machining tool being controlled by its speed regulator while the actual "leading" or "master" tool is driven with a constant rotation rate.

The advantage of the present invention is that with the method according to the invention different workpiece machinings can be carried out in short cycles and the service life of each of the rotary milling tools is optimized.

In a concrete embodiment, namely during cheek machining, the tooth advance is determined in dependence on the finished diameter dw, the diameter of the milling strip db, the offset diameter da, the miller diameter (diameter of the milling tool) D, and the chip thickness $h_{max}$ according to the following formula:

$$fz = \pi/360 \cdot [\arccos[(dB)^2 \cdot (da)^2 \cdot D^2/2 \cdot dB \cdot da] \cdot 180/\pi - \arccos[(dB)^2 + (da)^2 \cdot (D \cdot 2 \cdot hmax)^2/2 \cdot dB \cdot da] \cdot 180/\pi]$$

In a special application as a product of the following crankshaft parameters, the tool data, and the cut data including the workpiece rotation speed, the miller width diameter as well as the machining speed are determined according to the standard prior-art method. Thus Table 1 in particular shows the speed curve for the advance speed $v_f$ and thus the rotation-speed profile of the crankshaft $N_{KW}$.

On the contrary, if the variable crankshaft rotation rate is assumed it is possible to calculate the rotation rate of the second rotary miller, that, for example, serves for machining a pin bearing.

| Angle | | | 0 | 44 | 45 | 60 | 70 |
|---|---|---|---|---|---|---|---|
| Offset radius | ra | mm | 36 | 36 | 94 | 104 | 113 |
| Offset diameter | da | mm | 72 | 72 | 188 | 208 | 226 |
| Feed/teeth | fz(dw) | mm | 0.347 | 0.347 | 0.052 | 0.046 | 0.042 |
| Feed speed | vf(dw) | mm/min | 4137 | 4137 | 616 | 550 | 503 |
| Rotation speed | n(KJW) | 1/min | 19.65 | 19.65 | 2.93 | 2.61 | 2.39 |
| Arc length | l | mm | 12.8 | 12.8 | 84.5 | 94.8 | 104 |
| Teeth engaged | Ze | | 0.51 | 0.51 | 3.36 | 3.77 | 4.14 |

-continued

| | | | | | | | |
|---|---|---|---|---|---|---|---|
| Time | th | s | 0 | 0.37 | 0.01 | 0.9 | 0.67 |

| | | | | | | | |
|---|---|---|---|---|---|---|---|
| Angle | | | 80 | 90 | 100 | 140 | 150 |
| Offset radius | ra | mm | 120 | 121 | 122 | 118 | 114 |
| Offset diameter | da | mm | 240 | 242 | 244 | 236 | 228 |
| Feed/teeth | fz(dw) | mm | 0.039 | 0.039 | 0.039 | 0.04 | 0.042 |
| Feed speed | vf(dw) | mm/min | 471 | 467 | 463 | 480 | 498 |
| Rotation speed | n(KJW) | 1/min | 2.24 | 2.22 | 2.2 | 2.28 | 2.37 |
| Arc length | l | mm | 111.1 | 112.1 | 113.1 | 109 | 105 |
| Teeth engaged | Ze | | 4.42 | 4.46 | 4.5 | 4.34 | 4.18 |
| Time | th | s | 0.72 | 0.75 | 0.75 | 2.98 | 0.72 |

| | | | | | | | |
|---|---|---|---|---|---|---|---|
| Angle | | | 160 | 178 | 179 | 190 | 200 |
| Offset radius | ra | mm | 110 | 109 | 60 | 50 | 46 |
| Offset diameter | da | mm | 220 | 218 | 120 | 100 | 92 |
| Feed/teeth | fz(dw) | mm | 0.043 | 0.044 | 0.091 | 0.122 | 0.143 |
| Feed speed | vf(dw) | mm/min | 517 | 523 | 1083 | 1453 | 1711 |
| Rotation speed | n(KJW) | 1/min | 2.46 | 2.48 | 5015 | 6.9 | 8.13 |
| Arc length | l | mm | 100.9 | 99.9 | 47.9 | 35.7 | 30.4 |
| Teeth engaged | Ze | | 4.02 | 3.98 | 1.91 | 1.42 | 1.21 |
| Time | th | s | 0.69 | 1.21 | 0.04 | 0.3 | 0.22 |

| | | | | | | | |
|---|---|---|---|---|---|---|---|
| Angle | | | 210 | 220 | 230 | 240 | 250 |
| Offset radius | ra | mm | 43 | 38 | 36 | 36 | 36 |
| Offset diameter | da | mm | 86 | 76 | 72 | 72 | 72 |
| Feed/teeth | fz(dw) | mm | 0.168 | 0.253 | 0.347 | 0.347 | 0.347 |
| Feed speed | vf(dw) | mm/min | 2002 | 3021 | 4137 | 4137 | 4137 |
| Rotation speed | n(KJW) | 1/min | 9.51 | 14.35 | 19.65 | 19.65 | 19.65 |
| Arc length | l | mm | 26 | 17.4 | 42.8 | 12.8 | 12.8 |
| Teeth engaged | Ze | | 1.03 | 0.69 | 0.51 | 0.51 | 0.51 |
| Time | th | s | 0.19 | 0.14 | 0.1 | 0.08 | 0.08 |

| | | | | |
|---|---|---|---|---|
| Angle | | | 260 | 360 |
| Offset radius | ra | mm | 36 | 36 |
| Offset diameter | da | mm | 72 | 72 |
| Feed/teeth | fz(dw) | mm | 0.347 | 0.347 |
| Feed speed | vf(dw) | mm/min | 4137 | 4137 |
| Rotation speed | n(KJW) | 1/min | 19.65 | 19.65 |
| Arc length | l | mm | 12.8 | 12.8 |
| Teeth engaged | Ze | | 0.51 | 0.51 |
| Time | th | s | 0.08 | 0.085 |

TABLE 1

| | | | Cheek | | Bearing |
|---|---|---|---|---|---|
| | | | Cut 1 | Cut 2 | |
| Crankshaft data | | | | | |
| Finished diameter | dw | mm | 67 | | 57 |
| Offset diameter | | | 244 | | 4 |
| Tool data | | | | | |
| Miller diameter | D | mm | 800 | | — |
| Number of teeth | ze | | 100 | | 50 |

TABLE 1-continued

| | | | Cheek | | Bearing |
| --- | --- | --- | --- | --- | --- |
| | | | Cut 1 | Cut 2 | |
| Cut data | | | | | |
| Max. chip thickness | hmax | mm | 0.14 | | 0.13 |
| Cutting speed | vc | m/min | 300 | | 500 |
| Fast Speed | vE | mm/min | 10000 | | 10000 |
| Rotation rate | n(WZ) | 1/min | 119 | | 199 |
| Miller path diameter | dB | mm | 867 | | 857 |
| Overall time | | s | 11.9 | 27.3 | 4.7 |

What is claimed is:

1. A method of rotary milling workpieces that are rotated during machining about their own axes, whereby simultaneously at least two independently working rotary-milling tools conduct machining operations on different locations of the workpiece, wherein the workpiece rotation speed is varied or set to obtain an optimal machining with one rotary-milling tool and the tool rotation speed of the second and each further rotary-milling tool is set in accordance with the varying or set workpiece rotation speed; and wherein, with two rotary tools which simultaneously conduct milling operations, the predetermined chip thickness and the constant tool rotation speed of a first rotary milling tool are proportionately combined to determine the speed profile of the workpiece necessary to maximize the service life of the rotary milling tool and the tool rotation speed of the second rotary-milling tool is set in accordance with this speed profile.

2. The method according to claim 1 wherein for each of a plurality of machining operations carried out at succeeding times the optimum workpiece rotation speed is determined for each of the rotary-milling tools and then the lowest of the determined workpiece rotation speeds is employed, the tool rotation speeds of the others for which respective higher workpiece rotation speeds have been determined being correspondingly set, whereby the higher tool rotation speeds can be the determined optimal tool rotation speed or a lower tool rotation speed lying above a lower limit.

3. The method according to claim 2 wherein with all simultaneously conducted machining operations a constant chip thickness of 0.1 to 0.3 mm is established by the advance of the rotary miller.

4. The method according to claim 1 wherein the workpiece rotation speed is changed linearly between two limits.

5. The method according to claim 4 wherein the amounts of time for which an optimal workpiece rotation speed is determined are established depending on the changes of the workpiece contours to be machined.

6. The method according to claim 5 wherein the rotary tools are set next to one another for the simultaneous machining of parts of a crankshaft.

7. The method according to claim 6 wherein each tool is moved along at least one axis depending on the angular position of the workpiece so that as a result of or after machining there is a cylindrical shape.

8. The method according to claim 7 wherein the arc length, that is the portion of the workpiece in contact with the respective cutting insert relative to its overall circumference is only $1/10$ to $1/1000$ of the overall circumference.

9. The method according to claim 8 wherein in a first step all right-hand shapes and in a second step all left shapes of the profile, that is the finished, shapes are produced.

10. The method according to claim 9 wherein a machining step is carried out as orthogonal rotary milling.

11. The method according to claim 10 wherein the cutting inserts are moved at an effective cutting angle between $-5°$ and $+15°$ relative to the workpiece.

12. The method according to claim 11 wherein a back cutting angle is $\geq 0°$.

13. The method according to claim 12 wherein the sum of a free angle and of a wedge angle of the cutting inserts is $75°$ to $95°$.

14. The method according to claim 13 wherein when machining cylindrical workpieces lying eccentric to the workpiece axis, the different chip thickness produced from the guiding of the rotary-milling tool relative to the workpiece are compensated for by varying the advance or the tool rotation speed of the rotary milling tool.

15. The method defined in claim 1 wherein the tool rotation speed is controlled by rotating the workpiece at the lowest determined workpiece rotation speed and rotating the respective tool at its optimal tool rotation speed; and rotating the other tool at a tool rotation speed varying from its optimal tool rotation speed.

16. The method defined in claim 15 wherein when the workpiece rotation speed is increased the tool rotation speed of the other tool is decreased and when the workpiece rotation speed is decreased the tool rotation speed of the other tool is increased.

* * * * *